United States Patent [19]

Brennan et al.

[11] Patent Number: 5,312,016

[45] Date of Patent: May 17, 1994

[54] MASTIC APPLICATOR SYSTEM

[75] Inventors: Thomas J. Brennan, Rochester Hills; Michael DeFillipi, Grosse Pointe Park, both of Mich.

[73] Assignee: Johnstone Pump Company, Troy, Mich.

[21] Appl. No.: 971,218

[22] Filed: Nov. 4, 1992

[51] Int. Cl.$^5$ .............................. B67D 5/08
[52] U.S. Cl. .................... 222/55; 222/56; 137/487.5; 239/63
[58] Field of Search ............. 222/55, 56, 71; 137/487.5, 486; 251/61.4, 61, 492, 492.5; 239/63; 118/692

[56] References Cited

U.S. PATENT DOCUMENTS

| | | | |
|---|---|---|---|
| 2,530,799 | 11/1950 | Arvintz et al. | 219/39 |
| 3,690,292 | 9/1972 | Pasley, Sr. | 118/59 |
| 3,880,228 | 4/1975 | Houk et al. | 165/30 |
| 4,018,362 | 4/1977 | Ubaud | 222/55 |
| 4,029,094 | 6/1977 | Winicki | 222/55 |
| 4,628,861 | 12/1986 | Mitchell | 118/692 |
| 4,662,540 | 5/1987 | Schroter | 222/55 |
| 4,667,852 | 5/1987 | Siemann | 222/54 |
| 4,890,573 | 1/1990 | Zaber | 118/667 |
| 4,922,852 | 5/1990 | Price | 118/692 |
| 4,989,756 | 2/1991 | Kagamihara et al. | 222/55 |
| 4,998,502 | 3/1991 | Schucker | 118/667 |
| 5,029,731 | 7/1991 | Klatt | 222/54 |

Primary Examiner—Andres Kashnikow
Assistant Examiner—Philippe Derakshani
Attorney, Agent, or Firm—Krass & Young

[57] ABSTRACT

A mastic control system for delivering a mastic material to a surface in a precisely controlled manner. The system includes a mastic pump, a regulator receiving the mastic from the pump, a nozzle receiving the mastic from the regulator, a transducer sensing the pressure of the mastic flowing through the nozzle, a comparator comparing a signal from the transducer and a command signal corresponding to a desired mastic pressure and operative to generate a control signal which is constantly adjusted in response to a sensed difference between the transducer signal and the command signal, and an air valve receiving the control signal and operative to selectively adjust a poppet valve of the regulator in a manner to adjust the delivery of the mastic to the nozzle in compensation for the sensed departure of the mastic pressure in the nozzle from the pressure value dictated by the command signal.

14 Claims, 3 Drawing Sheets

MASTIC APPLICATOR SYSTEM

BACKGROUND OF THE INVENTION

This invention relates to a system for applying a mastic material to a surface.

The term "mastic material" is intended to cover any of various pasty substances used as coatings or adhesives. For example, mastic materials are finding increasing application in the automotive field and, specifically, are finding increasing application in facilitating the attachment of plastic automotive body panels to steel skeletons to form the automotive body. It is important in such applications that the volume of mastic material delivered by the system be precisely controllable in accordance with any predetermined volume profile. Whereas mastic applicator systems have been developed and utilized which are capable of providing such precise control of the volume of the mastic, these prior art systems are extremely complicated and extremely bulky and expensive, thereby significantly limiting their applicability in commercial environments.

SUMMARY OF THE INVENTION

This invention is directed to the provision of improved mastic applicator system.

More specifically, this invention is directed to the provision of a mastic applicator system which functions to precisely control the delivery of the mastic and yet which is extremely simple and inexpensive.

The invention mastic applicator system includes a source of mastic; a nozzle for applying the mastic to a surface; means for delivering the mastic from the source to the nozzle and including a regulator; means sensing a condition of the mastic proximate the nozzle outlet and operative to generate a mastic condition signal; means generating a command signal; means generating a control signal and operative to compare the mastic condition signal to the command signal and adjust the control signal in response to a sensed difference between the command signal and the mastic condition signal; and means varying the setting of the regulator in response to the control signal. This arrangement provides a simple and efficient means of carefully and precisely controlling the delivery of mastic at the nozzle.

According to a further feature of the invention, the sensed mastic condition is mastic pressure and the means sensing the mastic pressure comprises a transducer proximate the nozzle outlet. This specific construction provides a simple and efficient means of generating the necessary control signal for the system.

According to a further feature of the invention, the varying means comprises an air valve operative to generate an air pressure proportioned to the control signal for delivery to the regulator to vary the regulator setting in proportion to the control signal. This arrangement provides an inexpensive and yet effective means for varying the regulator setting.

In the disclosed embodiment of the invention, the mastic source comprises a mastic pump; the regulator includes a valve controlling the flow of mastic through the regulator and a large area member exposed to the control air pressure; and the regulator valve is arranged to be selectively positioned in response to a force balance including inlet mastic material pressure and air valve air pressure, tending to open the valve, and outlet mastic material pressure and a return force on the large area member tending to close the valve.

In one disclosed embodiment of the invention, the large area member is a diaphragm and the return force is generated by a return spring acting on the diaphragm, and in another disclosed embodiment of the invention the large area member is a piston and the return force is provided by shop air pressure acting against the piston.

DETAILED DESCRIPTION OF THE PREFERRED EMBODIMENT

Figure 1:
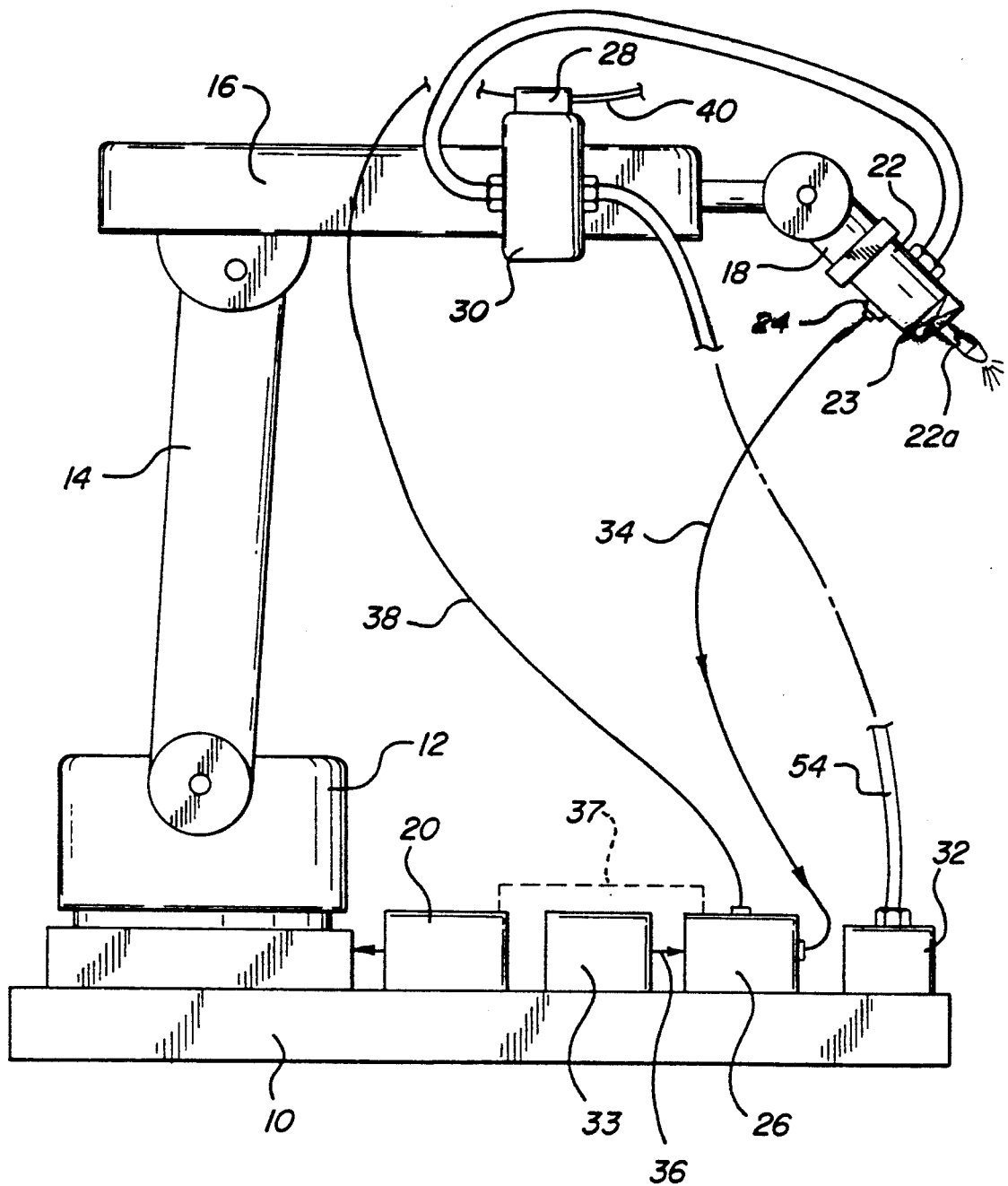
FIG. 1 is a somewhat schematic view of the invention mastic applicator system utilized in conjunction with a robotic assembly.

The invention mastic applicator system is illustrated in FIG. 1 in conjunction with a robotic assembly including a base 10, a pedestal 12 mounted for rotary movement on the base, a mast 14 pivotally mounted on the pedestal a boom 16 pivotally mounted on the upper end of the mast, an applicator arm 18 pivotally secured to the free end of the boom 16, and a controller 20 operative to control the robotic assembly in accordance with any predetermined pattern or program.

The invention mastic applicator system, broadly considered, includes a nozzle 22, a valve 23, a transducer 24, a comparator 26, an air valve 28, a regulator 30, a pump 32, and a command signal generator 33.

Nozzle 22 is suitably secured to the free end of applicator arm 18 and includes a tip 22a through which the mastic material delivered to the nozzle may be delivered in a carefully controlled manner so as to form a bead or spray or the like in a predetermined pattern along a surface of a part to be coated or adhesively secured to another part. Valve 23 is mounted on nozzle 22 and is movable between an open position in which mastic flows freely through the nozzle for discharge at the nozzle tip 22a and a closed position in which mastic flow through the nozzle is blocked. Valve 23 may be utilized to achieve a prepressurization of the system to a predetermined initial value by temporary closing of the valve.

Transducer 24 is mounted on the nozzle 22 and is arranged to sense the pressure of the mastic material flowing through the nozzle. Transducer 24 may take any of various conventional forms and may, for example, comprise a piezo crystal with a linear output between 0 and 10 volts corresponding to a sensed pressure of between 0 and 4,000 psi. It will be understood that the transducer will be provided with a suitable power supply (not shown). The transducer 24 may, for example, comprise a transducer available from PSI-TRONIX of Simi Valley, Calif. as Part No. PSI-10K-3K-G-FM 7/16-20 FM 0-10VOUT.

Comparator 26 receives a voltage signal from transducer 24, via a lead 34, proportioned to the sensed pressure of the mastic flowing through the nozzle 22, and also receives a command signal from command signal generator 33 on a lead 36 and functions to generate a control signal on line 38 for transmittal to air valve 28. Command signal generator 33 may deliver a constant value signal or a varying value signal to the comparator and may, for example, comprise a generator available from Bourns Inc. of Riverside, Calif. as Part No. 3540-1-10K. Alternatively, command signal generator 33 may be incorporated as part of controller 20 (and may provide a reference signal to comparator 26 on lead 37) in situations where it is desired to control the flow of mastic from nozzle 22 in a predetermined relation to the movements of the robotic assembly. Comparator 26 may, for example, comprise a comparator available from Flowtronics of Clarkston, Mich. as Part No. FTH-150-502.

Air valve 28 is mounted on top of regulator 30 and receives the control signal from comparator 26 on lead 38. Air valve 28 also receives a supply of pressurized air (for example, shop air) through a conduit 40 and functions in known manner to generate an output air pressure for delivery to the regulator 30 proportioned to the magnitude of the control signal delivered to the air valve on lead 38. Air valve 28 may for example comprise a valve available from Herion of Warrendale, Pa. as Part No. 40881-19-7053.

Regulator 30 is mounted on boom 16 and includes a regulator body 30a defining sealed chambers 30b, 30c and 30d; a flexible diaphragm 42 positioned in the valve body 30a with its upper face 42a in communication with chamber 30b and its lower face 42b in communication with chamber 30c; a stiffener plate 44 position against the lower face of the diaphragm; a rod 46 secured centrally to the lower face of stiffener plate 44 and extending downwardly through chamber 30c and sealingly through a bore 30e to position the lower end 46a of the rod in the upper portion of chamber 30d; a yoke 48 secured at its upper end 48a to the lower end 46a of rod 46 and extending downwardly through a passage 30f in the regulator body to position the lower end 48b of the yoke in a lower portion 30g of chamber 30d; a poppet valve 50 mounted at its lower end on the lower end 48b of yoke 48 and seating at its upper face 50a in a seat 30h defined by the regulator body; an inlet port 30 communicating with the seat 30h; an outlet port 30j communicating with passage 30f and connected to nozzle 22 by a hose 52; and a stack of Belleville washer springs 52 positioned in chamber 30c in surrounding relation to rod 46 with its lower end seated on the regulator body and its upper end bearing against the lower face of stiffener plate 44.

Pump 32 is connected to regulator inlet 30i by a hose 54 and may for example comprise an adhesive pump available from Johnstone Pump Co. of Troy, Mich. as Part No. 1001-SI-10-HDE.

In general, the invention mastic applicator system operates to vary the pressure drop in the supply path between the pump and the nozzle in response to sensed variations in the pressure of the mastic material flowing through the nozzle so as to ensure a constant or other desired and programmed flow pattern of mastic material through the nozzle irrespective of uncontrolled flow variations caused by changes in the pressure of the air supply, changes in the mastic supply pressure, or changes in the dynamic pressure drop.

Specifically, when starting up the system, command signal generator 33 issues a command signal (for example, two gallons per minute) to comparator 26 and comparator 26 issues an initial control signal on line 38 which is an approximation, based on experiential programming, of the control signal required to achieve the desired flow rate. The control signal on lead 38 is transmitted to control valve 28 which functions to adjust the output pressure of the control valve as applied to the diaphragm 42 through regulator port 30k and thereby selectively adjust the position of the poppet valve 50. Adjustment of the position of poppet valve 50 adjusts the size of the orifice through which the mastic material is flowing through the regulator and thereby establishes an initial mastic flow rate at nozzle 22. The initial flow rate to nozzle 22 is sensed by transducer 24 which generates a mastic pressure signal for transmission on line 34 to comparator 26. The comparator 26 compares the pressure signal (for example, 1.5 gallons per minute) from transducer 24 to the command signal (two gallons per minute) from signal generator 33 and generates an error signal, based on the difference between the transducer signal and the command signal, which is utilized to adjust the control signal by an amount equal to the noted differential between the command signal and the transducer signal. The adjusted control signal is thereupon transmitted to valve 28 which functions to adjust the output pressure of the control valve as applied to the diaphragm 42 through regulator port 30k and thereby selectively adjust the position of the poppet valve 50 to adjust the size of the orifice through which the mastic material is flowing through the regulator to establish a mastic flow rate corresponding to the command signal. It will be understood that the comparator 26 constantly compares the transducer signal from transducer 24 and the command signal from command signal generator 33 and constantly adjusts the control signal being transmitted on line 38 to air valve 28 in accordance with noted differentials in the command signal and the transducer signal so that the poppet valve 50 constantly "hunts" or "dithers" to maintain a mastic flow rate through the system corresponding to the command signal.

It will be seen that, at any given time, the poppet valve 50 is acted upon by opening and closing forces which become unbalanced in the event of an error or differential between the transducer signal and the command signal determined by the comparator, resulting in a hunting of the poppet valve to find a new position which will restore the pressure at the nozzle to the desired level. The opening forces operating on the poppet valve include the pressure of the mastic material in the inlet 30i and the force generated by the diaphragm by virtue of the air pressure operating on the upper face 42a of the diaphragm. The counterbalancing forces tending to close the poppet include the mastic material pressure in the chamber 30d acting on the lower face of the poppet valve and on the lower end of rod 46 and the return force generated by the spring 52.

It will be understood that the outlet material pressure is always lower than the inlet material pressure because of the dynamic pressure drop across the poppet valve 50. It is this pressure drop that is selectively varied in response to sensed variations in the pressure of the mastic flowing through the nozzle to maintain the pressure of the mastic flowing through the nozzle at a value that corresponds precisely and at all times to the pressure called for by the command signal being provided on line 36 by the command signal generator 33.

Figure 3:
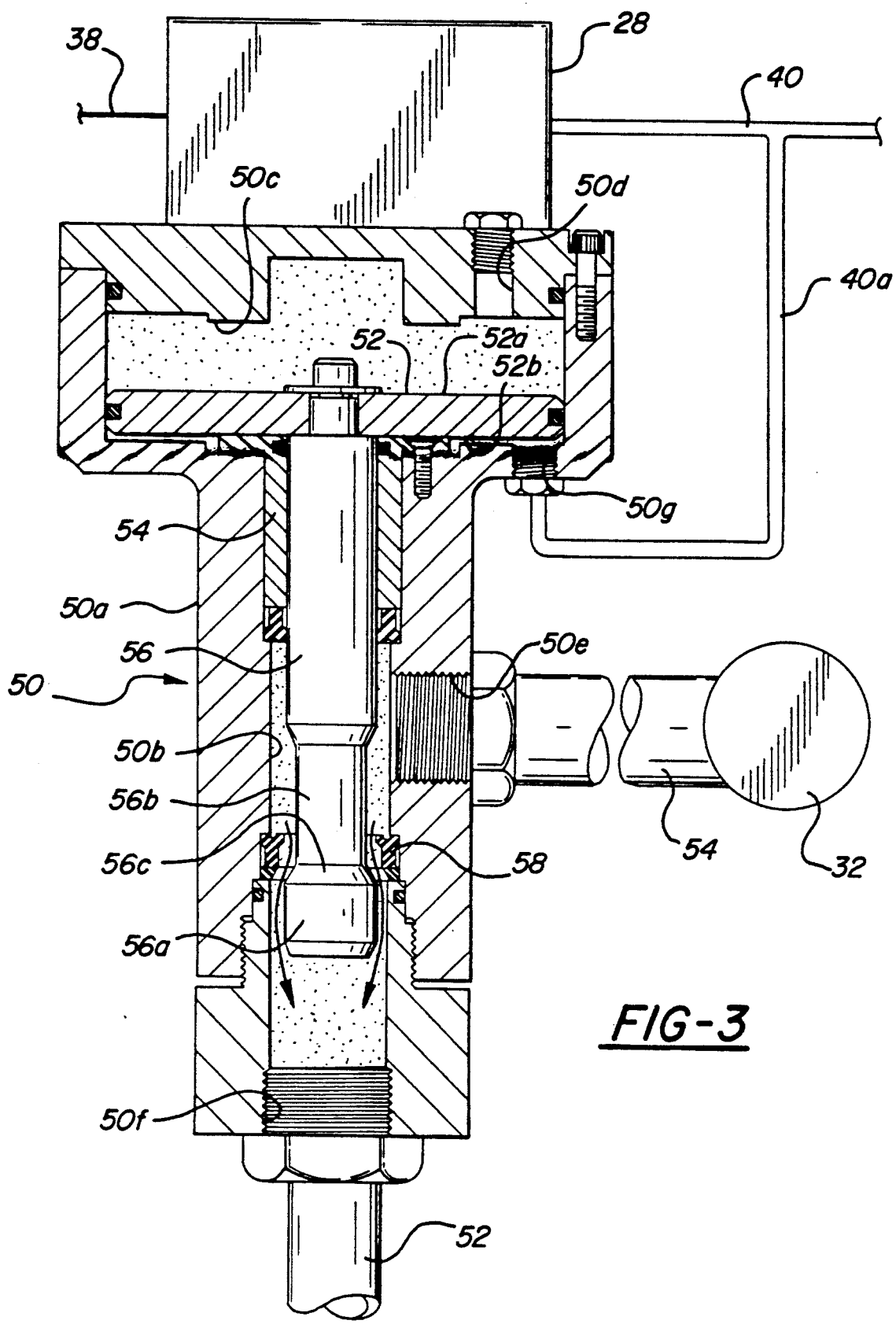
FIG. 3 is a schematic cross-sectional view showing an alternative form of regulator.

The alternate form of regulator 50 seen in FIG. 3 3 includes a regulator body 50a defining a central passage 50b; an upper chamber 50c; a piston 52 positioned in upper chamber 50c with its upper face 52a exposed to the control air pressure supplied to the chamber 50c from air valve 28 via a port 50d; a bushing 54 positioned in the upper end of passage 50b in underlying relation to piston 52; a piston rod 56 secured at its upper end to piston 52 and passing downwardly through bushing 54 and including a lower valving head portion 56a; an annular member 58 positioned in passage 50b proximate a reduced diameter portion 56b of piston rod 56 and coacting with a conical annular surface 56c on the upper end of valving head 56a to define a restrictive orifice for passage of the mastic material; an inlet port 50e communicating with hose 54 and with central passage 50b; and an outlet port 50f communicating with the lower end of passage 50b and with hose 52.

The opening forces operating on the valving head 56a include the inlet mastic material pressure and the air pressure applied to the upper face 52a of the piston 52 via control valve 28, and the counterbalancing closing forces acting on valving head 56a include the outlet mastic material pressure acting on the lower face of valving head 56a and air pressure applied to the lower face 52b of the piston 52 via a port 50g communicating with a conduit 40a connected to shop air.

Figure 2:
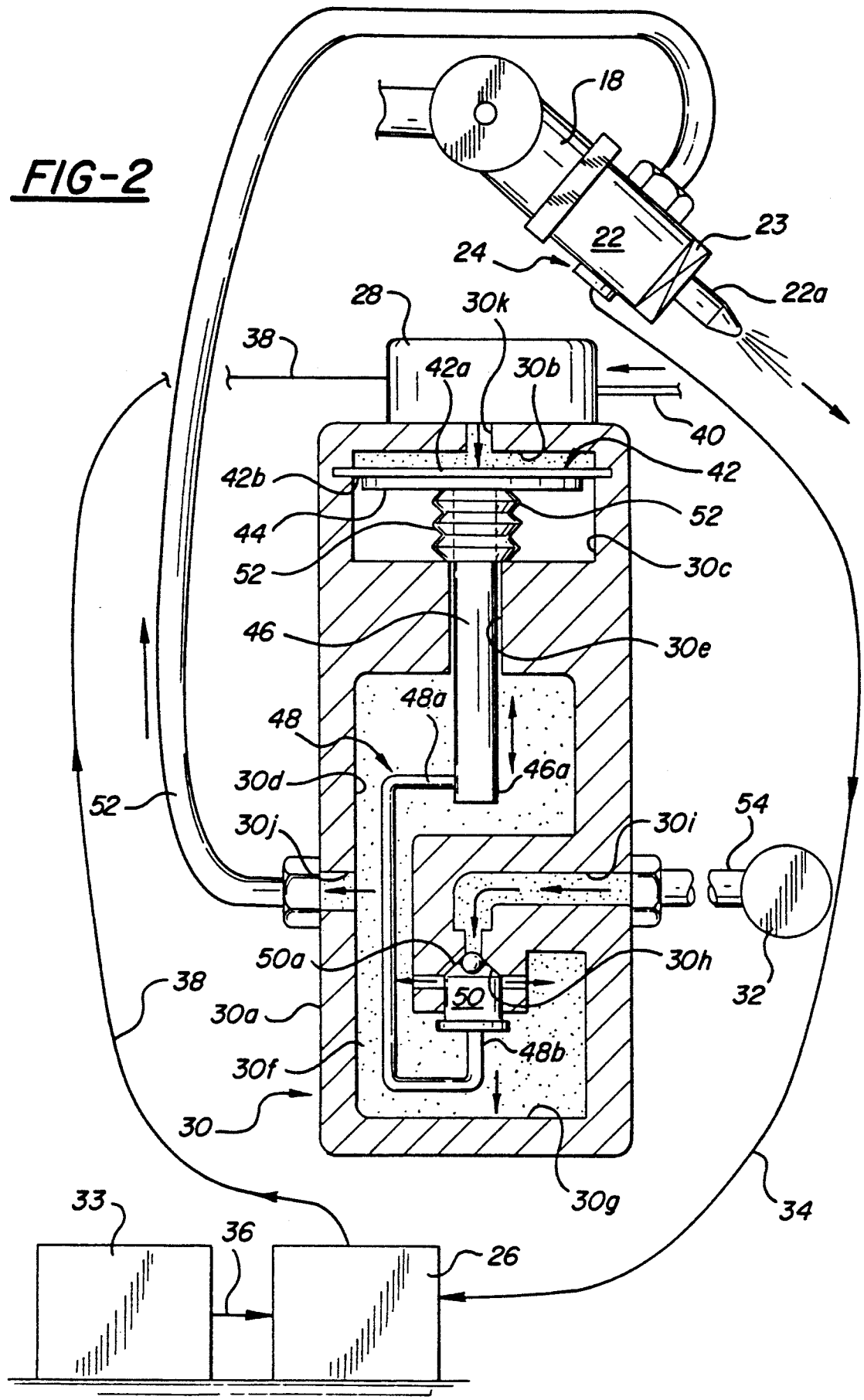
FIG. 2 is a schematic view showing details of a regulator employed in the invention mastic applicator system.

As with the regulator of the FIGS. 1 and 2 embodiment, the valving head 56a of the regulator 50 of the FIG. 3 embodiment hunts for a new position relative to annular member 58 in response to a control signal delivered on lead 38 to control valve 28 until a position is found in which the a force balance is provided and in which the newly defined orifice between the valving head surface 56c and the annular member 58 provides a mastic material flow sufficient to restore the pressure of the mastic material flowing through the nozzle, as measured by transducer 24, to the precise pressure being dictated by the instantaneous command signal being supplied by the command signal generator 33.

The invention mastic control system will be seen to provide a simple and inexpensive and yet extremely precise system for controlling the delivery of a mastic material to a nozzle for application to a surface.

Whereas preferred embodiments of the invention have been illustrated and described in detail, it will be apparent that various changes may be made in the disclosed embodiments without departing from the scope or spirit of the invention.

We claim:

1. A master applicator system comprising:
   a source of mastic;
   a nozzle for applying the mastic to a surface;
   means for delivering the mastic from the source to the nozzle and including a regulator having a regulator valve;
   means sensing a condition of the mastic proximate the nozzle outlet and operative to generate a mastic condition signal;
   means generating a command signal;
   means generating a control signal and operative to compare the mastic condition signal to the command signal and adjust the control signal in response to a sensed difference between the command signal and the control signal; and
   means varying the setting of the regulator valve in response to the control signal and including an air valve receiving said control signal and operative to generate an output air pressure signal proportional to the magnitude of the control signal and means receiving the output air pressure signal and operative to vary the setting of the regulator valve.

2. A system according to claim 1 wherein the sensed mastic condition is mastic pressure.

3. A system according to claim 2 wherein the means sensing the mastic pressure comprises a transducer proximate the nozzle outlet sensing the mastic pressure proximate the nozzle outlet.

4. A system according to claim 1 wherein said sensing means comprises a transducer mounted on said nozzle and operative to sense the pressure of the mastic flowing through the nozzle and generate an output signal proportioned to the mastic pressure for delivery to the comparing means.

5. A system according to claim 1 wherein the sensed mastic condition is mastic pressure, and the means sensing the mastic pressure comprises a transducer proximate the nozzle outlet sensing the mastic pressure proximate the nozzle outlet.

6. A mastic applicator system comprising a source of mastic, a nozzle for applying the mastic to a surface, and a supply path extending between the source and the nozzle characterized in that the pressure drop in the supply path is varied response to sensed variations in the pressure of the mastic flowing through the nozzle; the supply path includes a regulator; the setting of the regulator is varied in response to sensed variations in the pressure of the mastic flowing through the nozzle; the regulator includes a valving member positioned by controlled air under pressure; and the setting of the valving member is varied by varying the pressure of the controlled air.

7. The system according to claim 6 wherein the variations in the pressure of the mastic flowing through the nozzle is detected by a transducer mounted on the nozzle and operative to generate an output signal proportioned to the sensed mastic pressure.

8. A system according to claim 2 wherein the system includes a comparator receiving the transducer output signal, further receiving a command signal corresponding to a desired mastic pressure, and operative to generate the control signal based on a comparison of the command signal and the transducer output signal.

9. A mastic applicator system comprising:
   a pump;
   a regulator including a valving member operative to establish a mastic outlet pressure of the regulator;
   a nozzle;
   means establishing a mastic flow path extending from the pump to the regulator and thence to the nozzle;
   a transducer sensing the pressure of the mastic flowing through the nozzle and operative to generate an output signal proportioned to the mastic pressure;
   means generating a command signal;
   a comparator receiving the output signal and the command signal and operative to generate a control signal which is proportioned to the command signal and which is constantly adjusted in response to a sensed differential between the command signal and the output signal; and
   means operative in response to receipt of the control signal to vary the setting of the valving member and including means generating a closing force on the valving member proportioned to the mastic outlet pressure within the regulator downstream of the valving member.

10. A system according to claim 9 wherein the operative means includes a pneumatic valve receiving the control signal and operative to generate an output air pressure signal and operative to generate an output air pressure signal proportioned to the magnitude of the control signal.

11. A system according to claim 10 wherein the regulator includes a large area movable member exposed at one face thereof to the output pressure of the pneumatic valve and a rod secured at its one end to the large area member and at its other end to the valving member and the mastic outlet pressure acts against the rod and the valving member to generate the closing force.

12. A mastic applicator system comprising:
 a pump;
 a regulator;
 a nozzle;
 means establishing a mastic flow path extending from the pump to the regulator and thence to the nozzle;
 a transducer sensing the pressure of the mastic flowing through the nozzle and operative to generate an output signal proportioned to the mastic pressure;
 means generating a command signal;
 a comparator receiving the output signal and the command signal and operative to generate a control signal which is proportioned to the command signal and which is constantly adjusted in response to a sensed differential between the command signal and the output signal; and
 a pneumatic valve receiving the control signal and operative to vary the setting of the regulator in proportion to the control signal;
 the regulator defining a flow path through the regulator including a valving member;
 the pneumatic valve being operative to vary the setting of the valving member;
 the regulator including a large area movable member exposed at one face thereof to the output air pressure of the pneumatic valve and a rod secured at its one end to the large area member and at its other end to the valving member;
 the valving member being biased in one direction by the air pressure acting through the rod via the large area member and mastic inlet pressure upstream of the valving member and biased in an opposite direction by mastic outlet pressure downstream of the valving member and a return force acting on an opposite face of the large area member and resisting the movement of the large area member by the air pressure.

13. A system according to claim 12 wherein the large area member is a diaphragm and the return force is generated by a spring acting against the opposite face of the diaphragm to resist the movement of the diaphragm by the air pressure.

14. A system according to claim 12 wherein the large area member is a piston and the return force is generated by air under pressure acting against the opposite face of the piston.

* * * * *